UNITED STATES PATENT OFFICE.

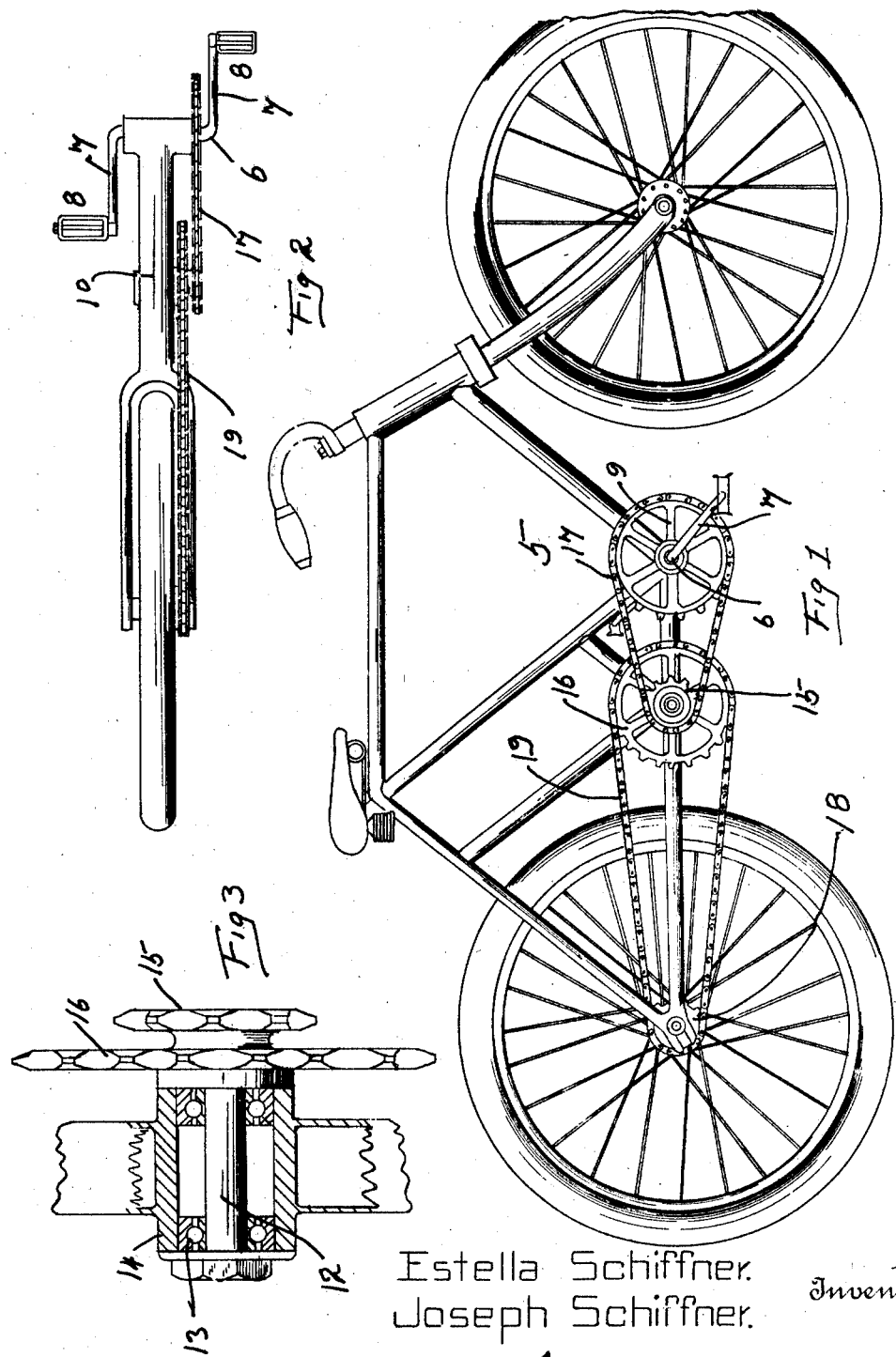

ESTELLA SCHIFFNER AND JOSEPH SCHIFFNER, OF LAFAYETTE, COLORADO.

BICYCLE-GEARING.

1,360,032.             Specification of Letters Patent.      Patented Nov. 23, 1920.

Application filed December 16, 1919. Serial No. 345,193.

*To all whom it may concern:*

Be it known that we, ESTELLA SCHIFFNER and JOSEPH SCHIFFNER, citizens of the United States, residing at Lafayette, county of Boulder, and State of Colorado, have invented certain new and useful Improvements in Bicycle-Gearings; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in gearing for bicycles, our object being to provide a gearing connection between the pedal shaft and the rear wheel of a bicycle whereby the speed for a given rotation of the pedal shaft may be increased to the desired extent without enlarging the crank shaft sprocket wheel. It is well known that a relatively large crank shaft sprocket wheel is annoying, since it greatly increases the tendency to soil the clothes of the rider, this being particularly true in the case of lady riders.

Heretofore, so far as we are aware, no means for increasing the speed of the machine for a given rotation of the crank shaft has been provided, except by enlarging the sprocket wheel of this shaft. In our improvement, the sprocket wheel of the crank shaft remains normal or of the usual size, and we mount a second shaft on the frame between the crank shaft and the rear wheel, and connect a small sprocket wheel on that shaft with the larger sprocket wheel of the crank shaft. We also mount a second sprocket wheel on the intermediate shaft, this second wheel being of the same size, preferably, as that upon the crank shaft. The larger sprocket wheel on the intermediate shaft is connected by means of a chain with a relatively small sprocket wheel on the hub of the rear wheel of the bicycle. In this way we obtain the desired speed or increased rotation of the rear wheel of the bicycle for a given rotation of the crank shaft, without increasing the size of the crank shaft sprocket.

Having briefly outlined our improvement, we will proceed to describe the same in detail, reference being made to the accompanying drawing, in which is illustrated an embodiment thereof. In this drawing:

Figure 1 is a side elevation of a bicycle equipped with our improved gearing.

Fig. 2 is a top plan view of the portion of the machine extending from the crank shaft rearwardly.

Fig. 3 is a horizontal section taken through the intermediate shaft, or that between the crank shaft and the rear wheel, the parts being shown on a larger scale.

The same reference characters indicate the same parts in all the views.

Let the numeral 5 designate a bicycle having the usual crank shaft 6, cranks 7 and pedals 8, together with a sprocket wheel 9, which it may be assumed is of ordinary or medium size. Mounted on the frame part 10, between the crank shaft and the hub of the rear wheel, is a second shaft 12, having suitable ball bearing connections 13, arranged within a hub 14, stationary with the frame. This shaft is provided with a small sprocket wheel 15 and a large sprocket wheel 16. The smaller wheel 15 is connected with the larger sprocket 9 by a chain 17, while the sprocket 16 is connected with the small sprocket 18 of the rear hub by means of a chain 19.

By virtue of this construction it will be understood that the speed of the rear wheel for a given rotation of the crank shaft is largely increased without enlarging the crank shaft sprocket. It is assumed that the sprocket 16 is of the same size as the sprocket 9 and that the two sprockets 15 and 18 are of the same size.

This construction will be found advantageous where a speed-increasing connection between the sprocket shaft and the rear wheel is desirable, or where the conditions or circumstances are such that it is desired to make considerable speed for a relatively slow movement of the crank or pedal shaft.

We claim:

In gearing for bicycles and similar machines, the combination with the usual crank shaft, sprocket wheel thereon and rear wheel sprocket, of a second shaft journaled in the bicycle frame between the crank shaft and rear wheel sprocket, the second shaft having two sprockets of different sizes, the smaller sprocket being on the outer end of said second shaft, a chain connecting the crank shaft sprocket with the smaller sprocket of the second shaft, and another chain connecting the larger sprocket on the second shaft with the rear wheel sprocket.

In testimony whereof we affix our signatures.

ESTELLA SCHIFFNER.
JOSEPH SCHIFFNER.